United States Patent
Suzuki et al.

(10) Patent No.: US 6,652,111 B2
(45) Date of Patent: Nov. 25, 2003

(54) IRRADIATION DEVICE FOR POLARIZED LIGHT FOR OPTICAL ALIGNMENT OF A LIQUID CRYSTAL CELL ELEMENT

(75) Inventors: Shinji Suzuki, Kawasaki (JP); Osamu Oosawa, Machida (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/307,985

(22) Filed: Dec. 3, 2002

(65) Prior Publication Data

US 2003/0086254 A1 May 8, 2003

Related U.S. Application Data

(60) Division of application No. 09/482,074, filed on Jan. 13, 2000, now Pat. No. 6,532,047, which is a continuation-in-part of application No. 09/179,201, filed on Oct. 27, 1998, now Pat. No. 6,190,016.

(30) Foreign Application Priority Data

Jan. 14, 1999 (JP) .............................. 11-007618

(51) Int. Cl.[7] ................................ G02B 5/30
(52) U.S. Cl. ..................... 362/96; 362/19; 359/487; 359/485; 359/486
(58) Field of Search ..................... 362/96, 19; 359/487, 359/485, 486, 488, 489, 490, 622, 618, 619, 621, 623, 849, 850, 497; 349/97, 96, 98

(56) References Cited

U.S. PATENT DOCUMENTS

| | | | |
|---|---|---|---|
| 3,439,968 A | | 4/1969 | Hansen et al. |
| 3,765,746 A | | 10/1973 | Ashley et al. |
| 4,195,422 A | | 4/1980 | Budmiger |
| 5,237,367 A | * | 8/1993 | Kudo ........................... 355/67 |

(List continued on next page.)

FOREIGN PATENT DOCUMENTS

| | | |
|---|---|---|
| EP | 0 754 976 | 1/1997 |
| GB | 2 309 794 | 8/1997 |
| JP | 7-072428 | 3/1995 |
| JP | 7-318861 | 8/1995 |
| JP | 8-094986 | 4/1996 |
| JP | 10-048590 | 2/1998 |
| JP | 10-090684 | 4/1998 |
| JP | 10-246877 | 9/1998 |
| WO | WO 97/37273 | 10/1997 |

OTHER PUBLICATIONS

Masaki Hasegawa et al., Nematic Homogeneous Alignment by Photo Depolymerization of Polymide, Proceedings of the International Display Research Confere Japn Display, Jan. 1, 1994, pp. 213–216, XP–00646416, Figure 2.

(List continued on next page.)

Primary Examiner—Mohammad Sikder
(74) Attorney, Agent, or Firm—Nixon Peabody LLP; David S. Safran (57) ABSTRACT

An improved irradiation device for polarized light for optical alignment of a liquid crystal cell element includes a lamp, a focusing mirror for focusing of the light of the lamp, an integrator lens, and a polarization element in which the polarization element is made such that several glass plates, which are located parallel to one another at a distance, are tilted by the Brewster angle with reference to the optical axis. The rotary motion of the above described polarization element around the center of the light beam incident in the polarization element (light beam being the axis of rotation), changes the polarization direction of the polarized light with which the alignment layer of the liquid crystal cell element is irradiated. The polarization element may be located in the vicinity of the integrator lens. In addition, the polarization element may be made in such a way that several glass plates which are located parallel and at a distance to one another and which are tilted by the Brewster angle with reference to the optical axis of the incident light beam, are each combined with one another in a V-shape and their apex lines pass through the center of the light beam.

4 Claims, 6 Drawing Sheets

U.S. PATENT DOCUMENTS

| | | |
|---|---|---|
| 5,452,128 A | 9/1995 | Kimura |
| 5,613,749 A | 3/1997 | Shikama et al. |
| 5,909,314 A | 6/1999 | Oka et al. |
| 5,934,780 A | 8/1999 | Tanaka |
| 6,064,524 A | 5/2000 | Oka et al. |
| 6,204,972 B1 | 3/2001 | Itoh |
| 6,257,726 B1 * | 7/2001 | Okuyama .................... 353/20 |

OTHER PUBLICATIONS

Fumitomo Abe, Irradiation Device for an LCD Element, Denshizairyo Kogyochosakai, (Electronci Materials Research Company of the Industry), Published in Jul. 1995., pp. 95 to 99.

Yoneo et al., High Definiation Front Projector Using Poly–Si TFT LCD, pp. 147–151, 1991, Conference Record of the 1991 International Display Research Donference.

* cited by examiner

IRRADIATION DEVICE FOR POLARIZED LIGHT FOR OPTICAL ALIGNMENT OF A LIQUID CRYSTAL CELL ELEMENT

CROSS-REFERENCE TO RELATED APPLICATION

This application is a division of U.S. patent application Ser. No. 09/482,074, filed Jan. 13, 2000, now U.S. Pat. No. 6,532,347, which is a continuation-in-part of application Ser. No. 09/179,201, filed Oct. 27, 1995, now U.S. Pat. No. 6,190,016.

BACKGROUND OF THE INVENTION

1. Field of the Invention

The invention relates to a light irradiation device for optical alignment of liquid crystals in which an alignment layer of a liquid crystal cell element is irradiated with polarized light.

2. Description of Related Art

A liquid crystal cell element is typically produced as follows:

An alignment layer which has been formed on the surface of a transparent substrate is treated for alignment of the liquid crystal into a desired direction (alignment treatment).

Two of these transparent substrates are cemented to one another such that the alignment layers are located on the inside and between the two substrates and a gap with a stipulated distance is maintained.

Liquid crystals are injected into this gap.

For the above described alignment treatment of the alignment layer of a liquid crystal cell element, there is a technique which is called "optical alignment". Here an alignment layer is irradiated with polarized light and exposed.

An irradiation device for polarized light for optical alignment is known, for example, from U.S. Pat. No. 5,934,780 which has already been proposed by the present applicant and assigned to the assignee of the present invention.

Figure 11:
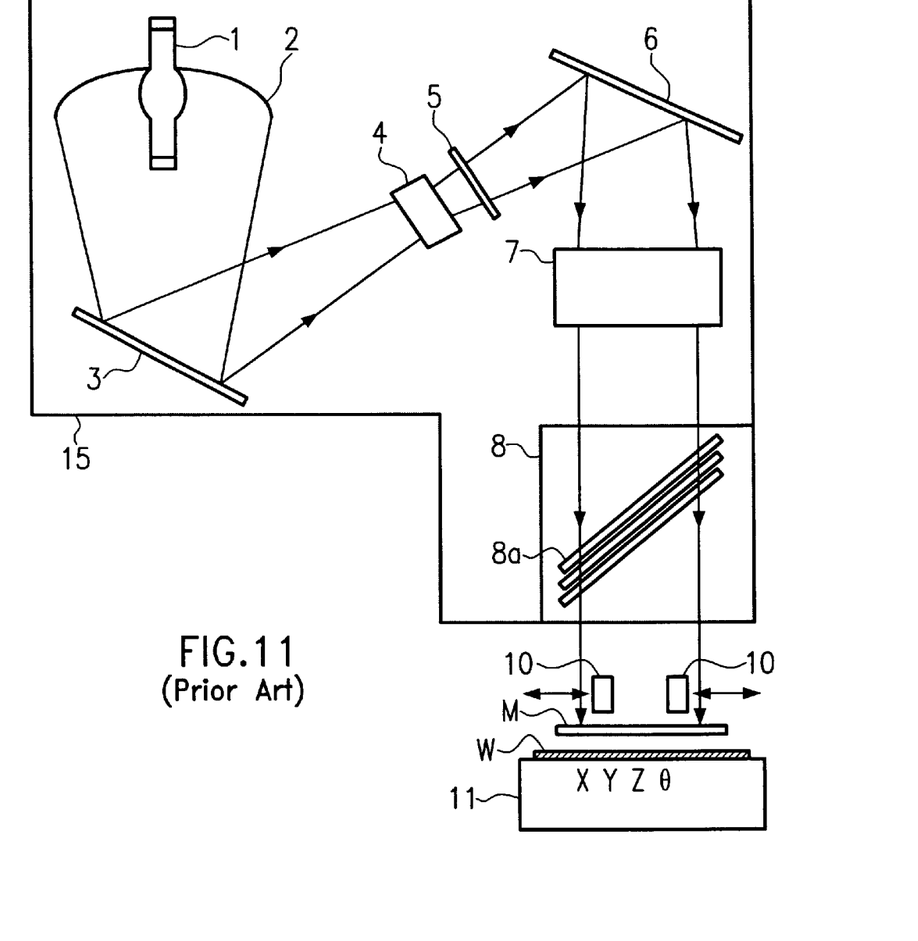
FIG. 11 shows a schematic of a prior art irradiation device for polarized light for optical alignment in which alignment treatment of an alignment layer of a liquid crystal cell element is done.

FIG. 11 shows the arrangement of the above described irradiation device 15 for polarized light which exposes the entire surface of a transparent substrate (hereinafter called the "workpiece W") on which an alignment layer is formed. This figure illustrates a discharge lamp 1 such as a super high pressure mercury lamp or the like, an oval focusing mirror 2, a first plane mirror 3, an integrator lens 4, a shutter 5, a second plane mirror 6, and a collimation lens 7 (a collimation mirror can also be used). Here however, a case is described in which a collimation lens is used. The reference number 8 labels a polarization element. In the polarization element 8 there are several glass plates 8a that are parallel to one another and are at a distance from one another. The plates are tilted by the Brewster angle with respect to the parallel light emerging from the collimation lens 7.

In the FIG. 11, the light which is radiated from the discharge lamp 1 and which contains UV radiation is focused by an oval focusing mirror 2, reflected by the first plane mirror 3 and is incident in the integrator lens 4. The light emerging from the integrator lens 4 is furthermore reflected via the shutter 5 by the second plane mirror 6, is converted into parallel light by the collimation lens 7 and is incident in the polarization element 8. Since a polarization element 8 transmits P-polarized light and for the most part, reflects S-polarized light, the light emerging from the polarization element 8 is converted mainly into P-polarized light which is emitted onto the workpiece W, such as a substrate or the like, which has been placed on the workpiece carrier 11. In FIG. 11 there are a mask M and an alignment microscope 10 which are used in the case of exposure by the above described multi domain method.

One liquid crystal cell element which is being currently used especially often (hereinafter called "a TN liquid crystal") is produced in such a way that the alignment direction of the liquid crystal is turned by 90° between two transparent substrates. To produce a "TN liquid crystal" therefore, two transparent substrates are needed with alignment layers which have different alignment directions.

In the irradiation device 15 shown in FIG. 11 for polarized light for optical alignment, to change the polarization direction of the polarized light which irradiates the alignment layer, conventionally the direction of the workpiece is changed. Afterwards the workpiece is put in place and exposure is done when the workpiece has been placed on the workpiece carrier which is irradiated with polarized light.

For example, in the case of the above described "TN liquid crystal" one workpiece is turned with respect to another workpiece by 90°, placed on the workpiece carrier 11 and irradiated with polarized light.

On the other hand, there is a pixel division method (also called the multi domain method) in which one pixel of a liquid crystal cell element is divided into two or more pixels, the alignment direction of the liquid crystal is changed for the pixel which has been formed by division, and thus, the angle of view field of the liquid crystal cell is improved.

In the case of using optical alignment for this pixel division method, the mask M which is shown in FIG. 11 and the alignment microscope 10 are used. Mask alignment marks and workpiece alignment marks are determined by the alignment microscope 10 and the workpiece carrier 11 is moved in the X-Y-θ directions (X-axis: the axis parallel to the workpiece surface, Y-axis: the axis which orthogonally intersects the X-axis and which is parallel to the workpiece surface, Z axis: the axis which orthogonally intersects the X-Y axes, θ: rotation around the Z-axis) to align the mask M to the workpiece W. After the alignment is completed, part of the pixel which has been generated by division and which was formed in the workpiece W is irradiated via the mask M with polarized light (here the mask M is provided with an opening pattern so that a partial area of the above described pixel, besides the part formed by division, is shielded).

Next, the mask M is replaced. The other part of the pixel formed by division is irradiated with light in the same way; the polarization direction of this light differing from the above described polarization direction. Since in the case of the device shown in FIG. 11, the polarization direction of the polarized light which irradiates the respective part of the pixel which has been formed by division is changed, the workpiece W together with the mask M must be turned and moved.

A transparent substrate (workpiece) of a liquid crystal cell element is made rectangular according to the shape of the liquid crystal cell, for example measuring 550×650 mm or 650×830 mm. In the irradiation device shown in FIG. 11 for polarized light, the light beam emerging from this device thus, conventionally has a shape which corresponds to the shape of the liquid crystal cell (the integrator lens 4 shapes the light beam). This is because the overall surface of the above described rectangular workpiece W must be completely exposed and the collimation lens 7 and the like of the irradiation device for polarized light is made as small as possible.

But in the case in which the workpiece, after changing its direction, is placed on the workpiece carrier, to change the polarization direction of the polarized light irradiating the alignment layer, it is necessary to make the light beam of the polarized light which irradiates the workpiece, as large as possible according to the longer side of the workpiece.

For example, in the case in which in a workpiece measuring 650×830 mm the polarization direction of the emitted polarized light is changed by 90°, it is necessary for the size of the light beam emitted onto the workpiece carrier to be at least 830×830 mm. This means that the size of the light beam is made larger than the surface of the actually irradiated workpiece. Consequently the light from the light source cannot be efficiently used.

To change the direction of the workpiece and to place it on the workpiece carrier, in a device for transporting the workpiece into/out of the workpiece carrier, there must be in addition (for example) a workpiece rotary part, such as for example a rotary carrier or the like and thus, the workpiece must be turned, or after placing the workpiece on the workpiece carrier the workpiece carrier must be turned.

But if an attempt is made to turn a large workpiece measuring 550×650 mm or 650×830 mm using the transport device, a large transport device is needed, with a proportion of the entire device which becomes larger causing the entire irradiation device to become larger. In the case of rotation of the workpiece carrier, a large workpiece carrier is turned. The construction of the device with respect to the competition for space of the above described workpiece transport device, protecting the rotational space and the like are made difficult. Consequently, the entire device also becomes larger.

In the case of use of the pixel division method, both the workpiece and also the mask must be turned. In order to turn the mask, a mask carrier rotation device is needed, causing the entire device to be even larger.

SUMMARY OF THE INVENTION

The invention was devised to eliminate the above described deficiency in the prior art. Therefore, the first object of the invention is to devise an irradiation device for polarized light for optical alignment of a liquid crystal cell element in which the polarization direction of the polarized light emitted onto the workpiece can be changed, and the light from the light source can be effectively used without the size of the light beam being made much larger than the area of the workpiece which has actually been irradiated.

A second object of the invention is to devise an irradiation device for polarized light for optical alignment of a liquid crystal cell element which eliminates the requirement for a transport device with a workpiece rotary part and eliminates the need for the workpiece carrier to turn where the entire irradiation device is not made larger, and in which also in an application for the pixel division method the mask need not turn.

These objects are achieved in accordance with one embodiment of the present invention by providing an improved irradiation device for polarized light for optical alignment of a liquid crystal cell element which comprises a lamp, a focusing mirror for focusing of the light of the lamp, an integrator lens, and a polarization element where the polarization element is made such that several glass plates which are located parallel to one another at a distance are tilted by the Brewster angle with reference to the optical axis. In accordance with the present invention, the rotary motion of the above described polarization element around the center of the light beam incident in the polarization element (light beam being the axis of rotation), changes the polarization direction of the polarized light with which the alignment layer of the liquid crystal cell element is irradiated.

In accordance with another embodiment, the polarization element may be located in the vicinity of the integrator lens. In addition, the polarization element may be made in such a way that several glass plates which are located parallel and at a distance to one another and which are tilted by the Brewster angle with reference to the optical axis of the incident light beam, are each combined with one another in a V-shape and their apex lines pass through the center of the light beam. In another embodiment, the above described two groups of the polarization elements may be arranged so that the directions of the apex lines of their V-shapes agree with one another and the directions of the V-shapes differ from one another. In yet another embodiment of the polarization element of the irradiation device for polarized light for optical alignment, the connecting surface of the two glass plates may be in contact with a plane in which the angle of incidence (with reference to the optical axis of the light incident in the polarization element) is 90°.

The preferred embodiments of the present invention are set forth in detail below together with the attached drawings.

BRIEF DESCRIPTION OF THE DRAWINGS

FIGS. 1(*a*) and 1(*b*) each show a cross-sectional schematic of the arrangement of a first embodiment of a polarization element in accordance with an embodiment of the present invention.

FIG. 2(*a*) shows a perspective view of an embodiment of a polarization element unit which has means for rotating the polarization element.

FIG. 2(*b*) shows cross-sectional schematic of the polarization element unit with means for rotating the polarization element shown in FIG. 2(*a*).

FIG. 4(*a*) shows a schematic profile of the connecting surface of glass plates in accordance with another embodiment of the present invention where the shadow formed by the junction of the two glass plates is made smaller.

FIG. 4(*b*) shows a perspective view of the glass plates of FIG. 4(*a*).

DETAILED DESCRIPTION OF THE INVENTION

Figures 1A, 1B:
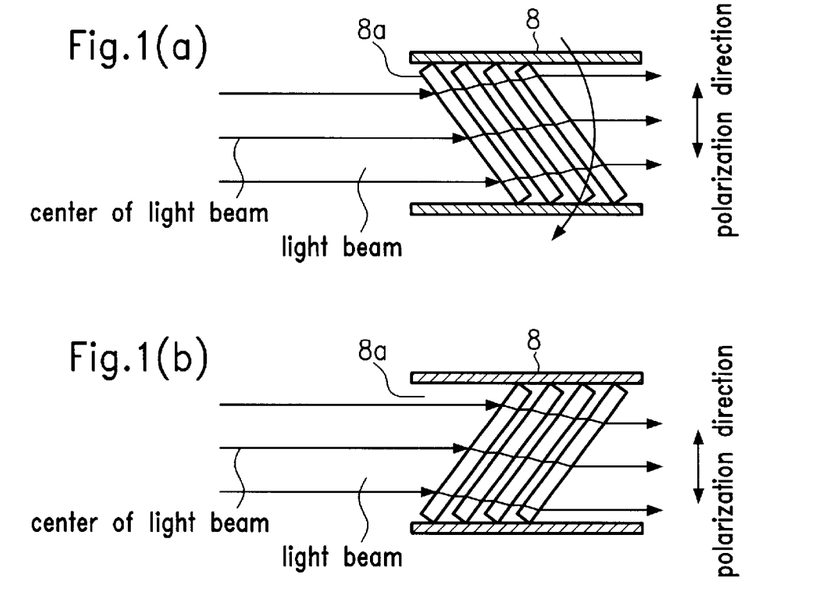

FIGS. 1 (*a*) and 1 (*b*) each show schematically the arrangement of a first embodiment of a polarization element 8 in accordance with the present invention. In this embodiment, a polarization element 8 is used in which several glass plates 8a which are arranged parallel to and at a distance from one another, are tilted with respect to the optical axis (the axis defined by the center of the incident light beam) by the Brewster angle, as is shown in the drawings. The above described polarization element 8 in accordance with the present invention is used in the irradiation device shown in FIG. 11 for polarized light (instead of the polarization element 8 in FIG. 11) and the polarization element 8 may be turned around the optical axis of the center of the incident light beam as its axis of rotation thereby to change the direction of the polarized light radiated onto the workpiece W. In the above described polarization element 8, the incident unpolarized light is polarized and separated by the glass plates 8a which are tilted by the Brewster angle with respect to the optical axis. This means that the S-polarized light is reflected by the glass plates, and only P-polarized light is transmitted.

By turning the polarization element 8 as shown in FIG. 1(a) around the center of the light beam in the direction which is shown in the drawings by the thick arrow, the light beam being the axis of rotation, the polarization direction of the polarized light emerging from the polarization element (P-polarized light) can be changed. If, for example, in an arrangement of the polarization element as shown in FIG. 1(a), this polarization element is turned by 90° (the polarization direction of the emerging polarized light: to the top and bottom on the page of the drawing) the polarization direction of the emerging polarized light turns 90°, by which it has a direction perpendicular to the page of the drawing. FIG. 1(b) is a schematic in which this polarization element is turned by 180°. In this case the polarization direction of the P-polarized light emerging from the polarization element agrees with that before rotation of the polarization element.

Figures 2A, 2B:
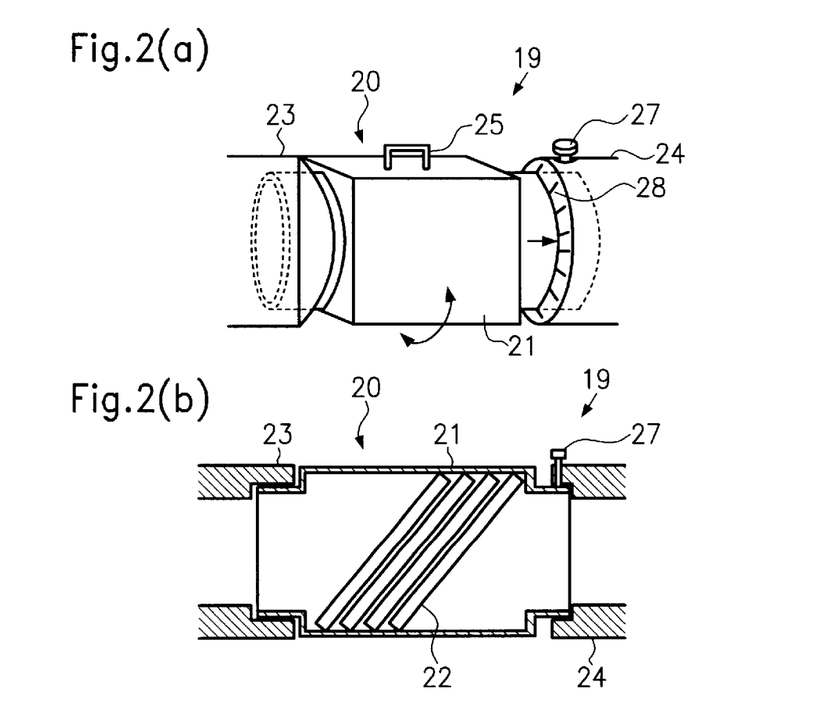

FIGS. 2(a) and 2(b) each show schematically, the arrangement of a specific example of a polarization element unit 19 in accordance with this embodiment. FIG. 2(a) is an overall view in a perspective representation. FIG. 2(b) is a cross-sectional view of FIG. 2(a). As is shown in FIGS. 2(a) and 2(b), within an outer envelope 21 of the polarization element part 20, four glass plates 22 are arranged parallel at distances to one another and are tilted by the Brewster angle with reference to the optical axis. The two ends of the outer envelope 21 of the polarization element part 20 are made cylindrical. The polarization element part 20 is rotatably held by holding components 23, 24 from the two sides of the polarization element part 20. The rotary motion of the polarization element part 20 with respect to the holding components 23, 24 is enabled by the arrangement of the two sides of the polarization element part 20 and the holding components 23, 24 that form flat slide bearings in the manner shown. Furthermore, as also shown, the outer envelope 21 is provided with a handle 25 so that the polarization element part 20 can rotate easily. In addition, there is a scale 26 which is shown in FIG. 2 (a) so that the angle of rotation of the polarization element part 20 can be easily recognized. In addition, there is a stop screw 27. After rotation of the polarization element part 20 up to a stipulated angle, the stop screw 27 may be fixed so that the position of the polarization element part 20 no longer deviates.

When a polarization element unit 19 which has a means of turning the polarization element part 20 according to FIG. 2 (a) and (b) is put in place instead of the polarization element 8 in FIG. 11, the polarization direction of the polarized light emitted onto the workpiece can be changed by turning the polarization element part 20 of this polarization element unit 8.

As can be appreciated, the rotation of the polarization element part 20 differs from the rotation of the workpiece carrier as was present in the prior art. Specifically, the competition for space of the workpiece transport device need not be considered in accordance with the present invention. In this embodiment, therefore, the device is prevented from being too large.

Furthermore the workpiece W need not turn either. It is therefore unnecessary for the light beam of the emitted polarized light to be made large according to the longer side of the workpiece W as required by the prior art, even if the workpiece W is not square. Thus, in contrast to the prior art devices, the light from the light source can be effectively used. Furthermore, in an application for the pixel division method the mask need not turn. It is therefore unnecessary to provide a mask carrier rotation device. This prevents the device from becoming too large.

As discussed above, FIGS. 2(a) and 2(b) illustrate an embodiment in which the two sides of the polarization element part 20 are provided with holding components 23, 24. But the polarization element part 20 can alternatively be held with only one of the holding components in other embodiments. Especially in the case of the arrangement of the polarization element unit at the location shown above using FIG. 11, it is sufficient if the polarization element part 20 is held such that the optical axis runs in the vertical direction. Thus, on the top of the polarization element part 20 there can be a holding component and the polarization element part 20 can be suspended.

In the case of the arrangement of the polarization element according to the above described first embodiment, the light which is incident in the polarization element 8 is interrupted in the manner shown in FIG. 1 (a) and (b), by which the positions of the incident light beam (its center) and the emerging light beam (its center) change. When this polarization element 8 is turned, the position of the light beam of the emerging light also changes. It is therefore necessary to move the workpiece according to the motion of this light beam or to make this light beam slightly larger with respect to the workpiece so that the entire workpiece is irradiated with polarized light, even if the light beam moves. However, the light beam need not be made as large enough to correspond to the length of the longer side of the workpiece as required in the prior art.

Figure 3:
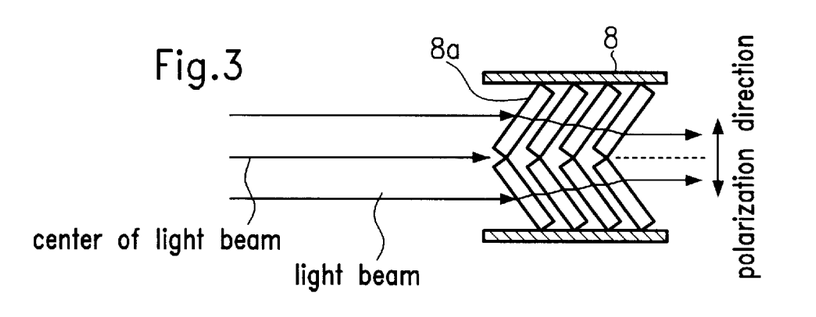
FIG. 3 shows a cross-sectional schematic of an example of the shape of another embodiment of the polarization element in accordance with the present invention.
Figures 4A, 4B:
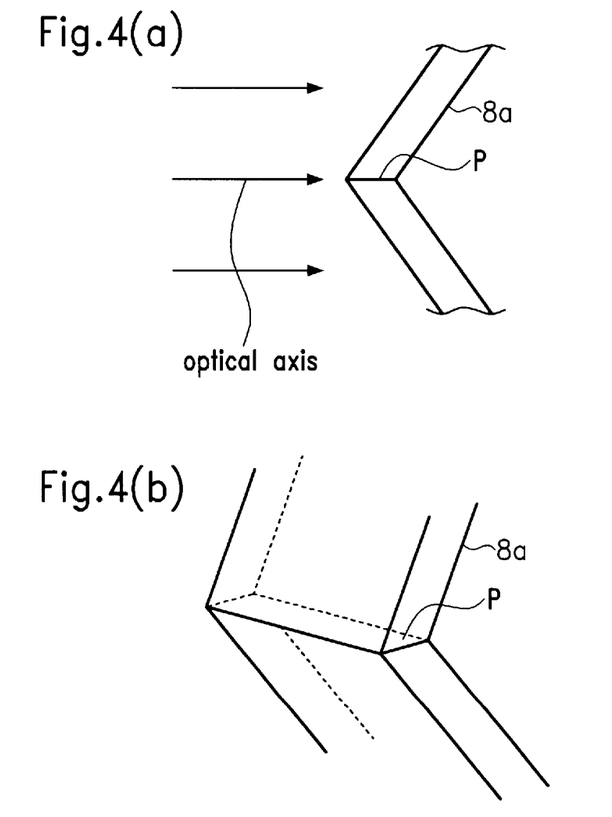

The above described deficiency can be eliminated by the measure described below where the glass plates of the polarization element 8 are each divided into two plates which are combined with one another in a V-shape, and are arranged such that the apex lines of these V-shapes pass through the center of the light beam incident in the polarization element. FIGS. 3, 4 (a), 4 (b), 5, 6, and 7 each show various different shapes of the polarization element according to this second embodiment of the invention.

FIG. 3 is a schematic of one embodiment in which the glass plates of the polarization element are each divided into two plates, combined with one another in a V-shape where the V-shaped glass plates are arranged such that their light incidence sides are made convex. As is shown in the drawings, in the case of arrangement of the glass plates 8a, the positions of the light beam incident in the polarization element 8 (its center) and the emerging light beam (its center) are prevented from diverging. The position of the light beam of the emerging light therefore, does not move even if the polarization element 8 is turned. It is therefore unnecessary to move the workpiece. In this way an arrangement is obtained in which the glass plates 8a are bent.

Therefore the length of the polarization element 8 in the direction of the optical axis can be made smaller than in the previously described embodiment of FIG. 1 (*a*) and (*b*). The optical path is therefore shortened, and the size of the entire irradiation device can be made smaller.

As seen in FIG. 3, the shape of the light beam emerging from the polarization element 8 is deformed compared to the shape of the incident light beam. The emerging light beam is reduced in size (to the top and bottom in the drawing) by refraction compared to the incident light beam. Therefore, when the polarization element 8 is turned, the shape of the light beam of the emerging polarized light is deformed. It is therefore necessary to build optically according to the degree of deformation of the light beam such that the size of this light beam which is incident in the polarization element is made slightly larger than the size of the workpiece so that the entire surface of the workpiece is fully irradiated with polarized light even when the light beam is deformed. But it is not necessary to make the light beam as large as the deformation which corresponds to the ratio of the longer side to the shorter side of the workpiece and which has already been described in the paragraphs preceding the citation of the object of the invention, since deformation only takes place by light refraction.

Since in the polarization element according to FIG. 3, the ends of the glass plates 8*a* having rectangular cross sections are butted together to form the V-shape, the junction of the two glass plates is projected onto the outlet side of the polarization element thereby forming a shadow. To make this shadow as small as possible, as is shown in FIGS. 4 (*a*) and (*b*), one plane of the two glass plates can be formed with a plane in which the angle of incidence with reference to the optical axis of the incident light is 90° (i.e. plane which is parallel to the optical axis) so that these planes abut together such that they are in contact along the connecting surface P. When light is reflected by the connecting surface P of the two glass plates 8*a*, faulty radiation is formed which is incident in the glass plates 8*a* with an angle outside the Brewster angle. In this way the property of the polarized light emerging from the polarization element is degraded. It is therefore desirable for the connecting surface P of the respective glass plate 8*a* to be processed, for example, roughened, in which the light incident in this connecting surface is not reflected, but is scattered, so that the intensity of the faulty radiation is attenuated.

Figure 5:
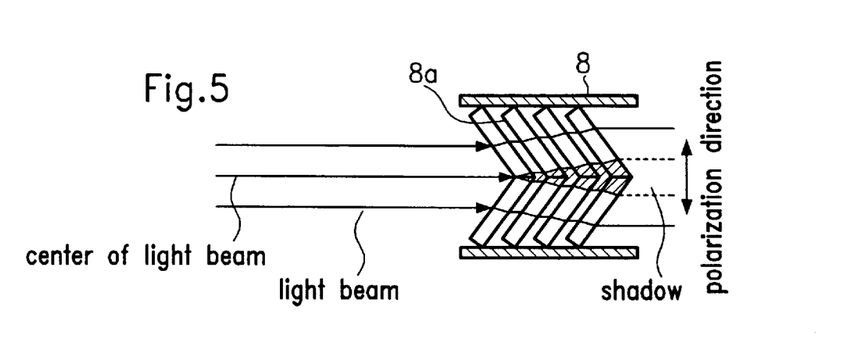
FIG. 5 shows a cross-sectional schematic of another example of the shape of the polarization element in accordance with another embodiment of the present invention.

FIG. 5 is a schematic of an embodiment in which glass plates 8*a* of the polarization element are divided into two plates, combined with one another in a V-shape and the V-shaped glass plates are arranged such that their light outlet sides are made convex. FIG. 5 shows a case in which the connecting surface of the two glass plates is formed as a plane in which the angle of incidence with reference to the optical axis of the incident light is 90°, as was shown in FIGS. 4 (*a*) and (*b*) described above. Also, in the case of FIG. 5, the positions of the light beam incident in the polarization element 8 (its center) and the emerging light beam (its center) are prevented from diverging, as was shown in FIG. 3. Furthermore, the length of the polarization element 8 can be shortened in the direction of the optical axis. In this illustrated shape however, the emerging light beam is enlarged to the top and bottom in the drawing. This broadening of the light beam in the vicinity of the emerging light beam yields a shadow as a result of the projection of the connecting surface of the glass plates, as is shown in FIG. 5.

It should be noted that not only parallel light, but also light with an angle by which oblique light is formed, is incident in the polarization element 8. When the polarization element 8 is located a certain distance from the surface to be irradiated, the above described oblique light also irradiates the shadow area with light. Therefore, in practice, depending on which material is used for the optical alignment, problems generally do not arise. In particular, the arrangement of the polarization element on the incidence side of the integrator lens makes the light through the integrator lens uniform and the effect of the shadow can be reduced, as is described below.

Figure 6:
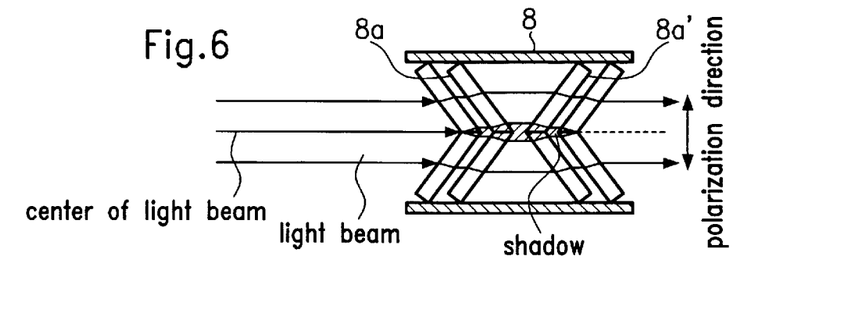
FIG. 6 shows a cross-sectional schematic of yet another example of the shape of the polarization element in accordance with another embodiment of the present invention.

FIG. 6 shows one embodiment in which two groups of V-shaped combinations of the glass plates 8*a* of the polarization element 8 which are each divided into two plates are prepared. As can be seen, the directions of the apex lines of these V-shapes are brought into agreement with one another and the apex lines of the V-shapes are opposite one another. More specifically, the apex lines of the V-shapes of the group of glass plates 8*a* located on the light incidence side are located toward the light outlet side, while the apex lines of the V-shapes of the group of glass plates 8*a*; which are located on the light outlet side are located toward the light inlet side.

As is shown in FIG. 6, in the arrangement of the glass plates 8*a*, the positions of the light beam incident in the polarization element 8 (its center) and of the emerging light beam (its center) are prevented from diverging. Furthermore, the light beam deformed by refraction using the glass plates 8*a* on the inlet side of the polarization element 8 can be returned to the original form by the refraction of the glass plates 8*a*; on the outlet side. Thus, the shape of the light beam incident in the polarization element 8 and the shape of the emerging light beam can be made the same. Neither the position nor the shape of the light beam of the emerging polarized light is changed, even if the polarization element 8 is turned. Nor is it necessary to move the workpiece (not shown) or optically alter the size of the light beam of the emerging polarized light so that it is made slightly larger with respect to the workpiece. Since the shadow area which is formed by the group of glass plates 8*a* located on the light inlet side is made smaller by the refraction of the group of glass plates 8*a*; located on the light outlet side, as is shown in FIG. 6, the effect of the shadow can be reduced. Since, in this case, the length of the polarization element 8 in the direction of the optical axis is the same as the length in FIG. 1, the length of the polarization element 8 in the direction of the optical axis will generally not be shortened as in FIGS. 3 and 5.

Figure 7:
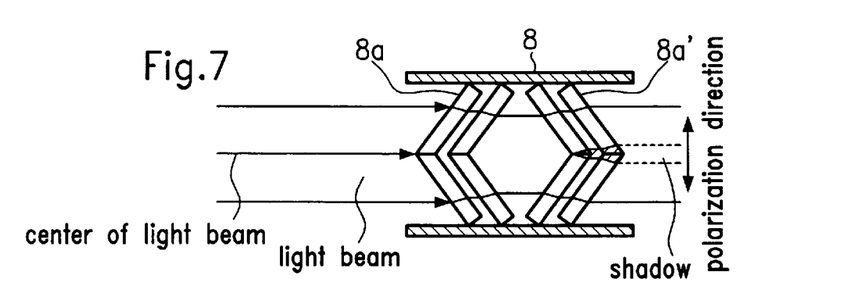
FIG. 7 shows a cross-sectional schematic of still another example of the shape of the polarization element in accordance with another embodiment of the present invention.

FIG. 7 shows another embodiment with two groups of V-shaped combinations of the glass plates of the polarization element 8 which are each divided into two plates, the directions of the apex lines of these V-shapes being brought into agreement with one another, and the apex lines of the V-shapes of the group of glass plates 8*a* located on the light incidence side are located on the light inlet side and the apex lines of the V-shapes of the group of glass plates 8*a*; are located on the light outlet side are located on the light outlet side. Like the prior example, the positions of the light beam incident in the polarization element 8 (its center) and the emerging light beam (its center) are prevented from diverging. Furthermore, since the light beam deformed by refraction by the glass plates 8*a* on the inlet side of the polarization element can be returned to the original form by the refraction of the glass plates 8*a*; on the outlet side, the shape of the light beam incident in the polarization element 8 and the shape of the emerging light beam can be made the same. Therefore, the position or the shape of the light beam of the emerging polarized light does not change, even if the polarization element 8 is turned. Nor is it necessary to move the workpiece (not shown) or to optically alter the size of the light beam of the emerging polarized light to be slightly larger with respect to the workpiece. In this case however, the light beam in the group of glass plates 8a; located on the rear step of the polarization element 8 is broadened. Therefore, in the vicinity of the center of the emerging light beam, a shadow may form as a result of the projection of the connecting surface of the glass plates 8a;, as is shown in the drawings. Since in this case, the length of the polarization element 8 in the direction of the optical axis is the same as the length in FIG. 1, the length of the polarization element 8 in the direction of the optical axis will generally not be shortened as in FIGS. 3 and 5.

In the above described first and second embodiments for example, a case was described in which the polarization element is located on the outlet side of the collimation lens 7 of an arrangement shown in FIG. 11 and discussed previously. However, the same effect can be attained even if this polarization element 8 is located in the vicinity of the integrator lens 4 also previously discussed relative to FIG. 11.

Figure 8:
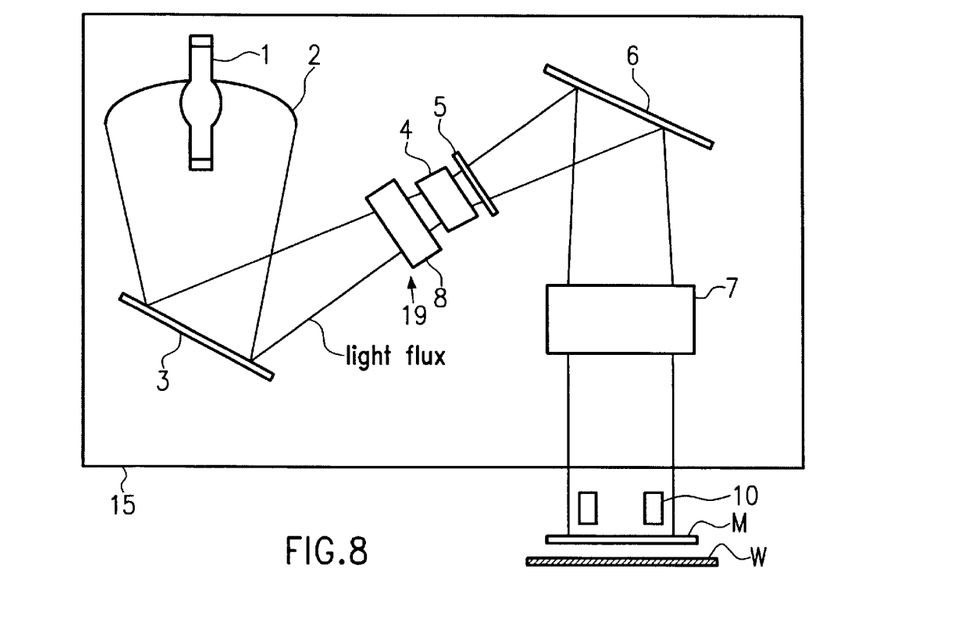
FIG. 8 shows a schematic of a third embodiment of the invention in which the polarization element is located in the vicinity of an integrator lens.

FIG. 8 shows a third embodiment of the present invention in which the polarization element 8 is located on the inlet side of the integrator lens 4. The remaining arrangement is substantially similar to FIG. 11, the same parts being enumerated with the same reference numbers as in FIG. 11. As is clearly shown in FIG. 8, the polarization element 8 can be made smaller when the polarization element 8 is located on the inlet side of the integrator lens 4 in which the light beam has become smaller by focusing. Therefore, the polarization element unit 19 can be made smaller and may be provided with a rotary means as shown in FIG. 2 for the rotation of the polarization element part 20. Thus, a reduction in the size of the entire irradiation device 15 is enabled.

Furthermore, arranging the polarization element 8 as in the manner described in FIGS. 3 to 7 prevents the positions of the light beam incident in the polarization element (its center) and of the emerging light beam (its center) from diverging. The position of the light beam of emerging light therefore, does not move even when the polarization element 8 is turned. Thus, the size of the collimation lens 7 located on the outlet side of the polarization element 8 and of the other optical elements, such as the mirror 6 or the like, can be reduced. Thus, the present invention simplifies the optical construction comprising these optical elements for maintaining the polarized light emitted onto the workpiece for its stipulated properties.

In FIG. 8, the light emerging from the oval focusing mirror 2 is not parallel light. Therefore, the angle of incidence of the light incident in the polarization element 8 does not always become the Brewster angle. The amount of irradiation in the area which is outside the center of the light irradiation area therefore decreases. Simultaneously, the polarization direction in the center area of the light irradiation area deviates sightly from that in the outer peripheral area thereof. Since the integrator lens 4 makes the distribution of the illuminance of the light and the distribution of the polarization direction uniform, for the light emerging from the polarization element 8, the integrator lens 4 makes the distribution of the illuminance and the polarization direction uniform. Thus, problem-free optical alignment of the entire area of the workpiece can be attained. Also, in the case of using the polarization element as shown in FIGS. 5 and 7 in which a shadow is formed in the vicinity of the center of the emerging light beam, the distribution of the illuminance is made uniform by the integrator lens 4. Consequently, its influence hardly arises on the area to be irradiated.

It should be noted that whereas FIG. 8 shows an embodiment in which there are a collimation lens 7, a mask M and an alignment microscope 10, these optical elements are not absolutely essential to practice the present invention. However, they will be required in applications for executing the multi domain method described previously. In addition, the light emitted onto the workpiece W need not be parallel light.

Figure 9:
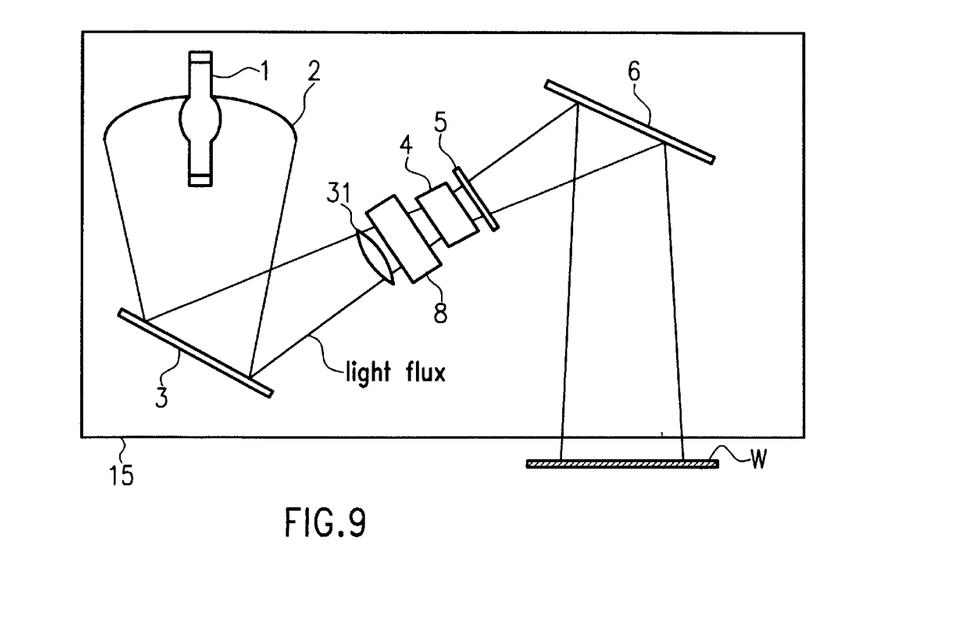
FIG. 9 shows a schematic of an alternative version of the present invention shown in FIG. 8.

FIG. 9 is a schematic of another version (1) of the third embodiment in which on the incidence side of the polarization element 8 according to FIG. 8 there is an input lens 31 which is used to make the light emerging from the oval focusing mirror 2 parallel. In FIG. 9 the collimation lens 7, the mask M and the alignment microscope 10 are omitted. In an application for executing the multi domain method discussed previously, it would be necessary to use these optical elements. Since in this embodiment, the input lens 31 converts the light incident in the polarization element 8 into parallel light, the angle of incidence of the light incident in the polarization element 8 can be essentially the Brewster angle. The distribution of the illuminance of the polarized light emerging from the polarization element 8 is therefore, made more uniform than in the embodiment as shown in FIG. 8. Thus the quality of the polarization direction (the ratio of the proportion of P-polarized light to the proportion of S-polarized light) can be increased.

Since in this embodiment, the polarization element 8 is located on the inlet side of the integrator lens 4 in which the light beam was made smaller by focusing, the polarization element 8 can likewise be made smaller, as in FIG. 8. Furthermore, the arrangement of the polarization element 8 in the manner shown in FIGS. 3 to 7 prevents the position of the light beam of the emerging light from moving, even if the polarization element 8 is turning. Thus, the size of the optical elements located on the outlet side of the polarization element 8, such as the integrator 4, mirror 6, and the like can also be reduced.

Figure 10:
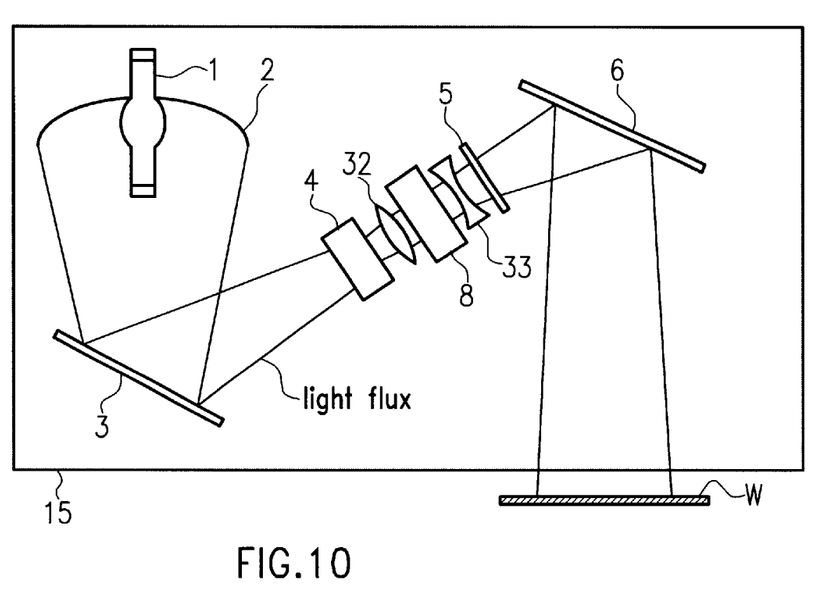
FIG. 10 shows a schematic of still another version of the present invention shown in FIG. 8.

FIG. 10 is a schematic of still another embodiment of the present invention in which the polarization element 8 is located on the outlet side of the integrator lens 4 and at the same time, there are provided a first lens 32 and a second lens 33, the first lens 32 converting the light emerging from the integrator lens 4 into parallel light and allowing it to be incident in the polarization element 8, and the second lens 33 scattering the light emerging from the polarization element 8. In FIG. 10 as well, the collimation lens 7, the mask M and the alignment microscope 10 are omitted. In applications where the multi domain method is to be executed, such optical elements would be necessary.

Since in this embodiment the light incident through the first lens 32 into the polarization element 8 is parallel light, the angle of incidence of the light incident in the polarization element 8 can be essentially the Brewster angle. Furthermore, the light flux of the light emerging from the polarization element 8 can be broadened and the required irradiation surface can be guaranteed on the light irradiation side by the measure that there is a second lens 33 and the parallel light emerging from the polarization element 8 is converted into scattered light. Since in this embodiment as well, the polarization element 8 is provided on the outlet side of the integrator lens 4 in which the light beam was made smaller by focusing, the latter can likewise be made smaller. Furthermore, the arrangement of the polarization element 8 in the second embodiment shown in FIGS. 3 to 7 makes it possible to reduce the size of the optical elements located on the outlet side of the polarization element 8 as well.

Since in this embodiment, the polarization element 8 is located on the outlet side of the integrator lens 4, as was shown in FIGS. 8 and 9, the light emerging from the polarization element 8 cannot be made uniform by the integrator lens 4. Therefore, in the application of the polarization element 8 shown in FIGS. 5 and 7, it is possible for an influence of the shadow to arise. Since the polarization element and the area to be irradiated are a certain distance from one another, the shadow area is also irradiated by the oblique light and in this way, no problems arise in practice, as was described above.

As was described above, the following effects were obtained by practicing the present invention. First, since in the polarization element of an irradiation device for polarized light for optical alignment of a liquid crystal cell element there are several glass plates which are parallel to and a distance from one another which are tilted with respect to the optical axis by the Brewster angle, and because the polarization element may be turned around the center of the light beam incident on the polarization element as the axis of rotation by rotary motion of the polarization element, the polarization direction of the polarized light irradiated onto the alignment layer which is formed on a transparent substrate (workpiece) of the liquid crystal cell element can be changed to any angle, without turning the workpiece.

In addition, it is not necessary to place the means for turning the workpiece in the workpiece transport device and to turn the workpiece carrier. Consequently, the entire irradiation device can be made smaller. Furthermore, it is unnecessary to make the light beam of the emitted polarized light large even if the workpiece has a rectangular shape instead of a square shape. In this way, the light from the light source can be efficiently used. Furthermore, in an application for the pixel division method, it is not necessary to turn the mask. In this way the irradiation device is prevented from becoming large.

Furthermore, as discussed above, the polarization element and the means for turning the polarization element can be made smaller and the entire device reduced in size by placing the polarization element in the vicinity of the integrator lens.

As shown in FIGS. 3 to 7 discussed above, the glass plates of the polarization element may be combined with one another in a V-shape with the V-shaped apex lines passing through the center of the light beam. This prevents the position of the light beam emerging from the polarization element from moving, even if the polarization element is turning. Especially in the case where the polarization element is positioned in the vicinity of the integrator lens, the optical construction which comprises a collimator and the like placed on the outlet side of the polarization element is simplified.

Moreover, as also shown and discussed relative to FIGS. 3 to 7, the connecting surface of the two glass plates may be formed as a plane in which the angle of incidence with respect to the optical axis of the incident light is 90° (i.e. the plane parallel to the optical axis) so that the two glass plates are in contact with one another by this plane. This arrangement makes it possible to reduce the size of the shadow in the best possible way as a result of the projection of the connecting surface of the glass plates. Furthermore, degradation of the property of the polarized light emerging from the polarization element can be prevented by the above described connecting surface being made as a light scattering surface. Thus polarized light with a good property can be emitted onto the workpiece.

While various embodiments in accordance with the present invention have been shown and described, it is understood that the invention is not limited thereto. These embodiments may be changed, modified and further applied by those skilled in the art. Therefore, this invention is not limited to the details shown and described previously but also includes all such changes and modifications which are encompassed by the appended claims.

What is claimed is:

1. Irradiation device for an alignment layer of a liquid crystal cell element, comprising:

a lamp;

a focusing mirror for focusing light emitted from said lamp;

an integrator lens;

a first lens which is located on an outlet side of the integrator lens and from which parallel beams of light emerge;

a second lens which converts the parallel beams emerging from the first lens into nonparallel scattered light; and a polarization element which is located in an optical path between the first lens and the second lens.

2. Irradiation device for an alignment layer of a liquid crystal cell element as claimed in claim 1, wherein the polarization element comprises a filter having a vacuum evaporated multilayer film on a substrate and which polarizes light in a predetermined wavelength range; and wherein, for the light incident on the filter, adjacent layers of the multilayer film have different indexes of refraction with respect to a defined portion of polarized light.

3. Irradiation device for an alignment layer of a liquid crystal cell element as claimed in claim 1, wherein in the polarization element comprises a plurality glass plates which are parallel to each other with a spacing therebetween, and which are inclined with respect to the optical path by the Brewster angle.

4. Irradiation device for an alignment layer of a liquid crystal cell element as claimed in claim 3, wherein at least one of the glass plates has a vacuum evaporated film with a high transmission factor for P-polarized light and a high reflectance factor for S-polarized light thereon.

* * * * *